United States Patent
Choi et al.

(10) Patent No.: US 8,249,657 B2
(45) Date of Patent: Aug. 21, 2012

(54) APPARATUS AND METHOD FOR ALLOCATING PREAMBLE INDEX TO SELF CONFIGURABLE BASE STATION IN A BROADBAND WIRELESS COMMUNICATION SYSTEM

(75) Inventors: Eun-Sun Choi, Gwacheon-si (KR); Byoung-Ha Yi, Seoul (KR); Ki-Young Han, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 761 days.

(21) Appl. No.: 12/325,382

(22) Filed: Dec. 1, 2008

(65) Prior Publication Data

US 2009/0147733 A1    Jun. 11, 2009

(30) Foreign Application Priority Data

Dec. 5, 2007  (KR) .......................... 10-2007-0125490

(51) Int. Cl.
*H04M 1/00* (2006.01)
*H04B 1/38* (2006.01)

(52) U.S. Cl. .................. 455/561; 455/185.1; 455/562.1

(58) Field of Classification Search ............... 455/185.1, 455/561, 562.1
See application file for complete search history.

(56) References Cited

U.S. PATENT DOCUMENTS

| 2007/0270113 | A1  | 11/2007 | Oh et al. |
| 2008/0310320 | A1* | 12/2008 | Kim et al. ...................... 370/252 |
| 2008/0318582 | A1* | 12/2008 | Moon et al. ................... 455/446 |

FOREIGN PATENT DOCUMENTS

| KR | 10-2001-0103316 A | 11/2001 |
| KR | 10-2005-0100853 A | 10/2005 |
| KR | 10-2007-0077579 A | 7/2007 |

* cited by examiner

*Primary Examiner* — John Poos
(74) *Attorney, Agent, or Firm* — Jefferson IP Law, LLP

(57) ABSTRACT

An apparatus and method for allocating a preamble index to a self configurable base station in a broadband wireless communication system are provided. The apparatus comprises a first selector for selecting a segment IDentifier (ID) to be allocated to a Self Configurable-Base Station (SC-BS) by using a per-segment ID Received Signal Strength Indicator (RSSI) estimated by the SC-BS, a second selector for selecting an ID cell to be allocated to the SC-BS by using geographical location information of surrounding BSs, and a communicator for transmitting a segment ID and the ID cell to the SC-BS.

10 Claims, 6 Drawing Sheets

: SECTOR WHERE SAME FA WITH SC-BS IS USED

APPARATUS AND METHOD FOR ALLOCATING PREAMBLE INDEX TO SELF CONFIGURABLE BASE STATION IN A BROADBAND WIRELESS COMMUNICATION SYSTEM

PRIORITY

This application claims the benefit under 35 U.S.C. §119 (a) of a Korean patent application filed in the Korean Intellectual Property Office on Dec. 5, 2007 and assigned Serial No. 10-2007-0125490, the entire disclosure of which is hereby incorporated by reference.

BACKGROUND OF THE INVENTION

1. Field of the Invention

The present invention relates to a broadband wireless communication system. More particularly, the present invention relates to an apparatus and method for allocating a preamble index to a Self Configurable-Base Station (SC-BS) in a broadband wireless communication system.

2. Description of the Related Art

Recently, research efforts have focused on developing a wireless communication system that can transmit a large amount of data at high speed. For that purpose, several different concepts are being considered. For example, concepts such as the reduction of a cell size to increase system throughput, the employing of a smaller Base Station (BS) that has a lower price, the employing of an indoor BS for office and home, and other concepts are being considered. In the case that the smaller BS is employed, a function for the automatic installation of a BS and a function for recognizing a change in the configuration of adjacent BSs are needed to make frequent installation and de-installation of the small BSs easier. Accordingly, in the $3^{rd}$ Generation Partnership Project Long-Term Evolution (3GPP LTE), these functions are referred to as self organization and are in the process of standardization.

A BS must transmit a preamble signal for frame synchronization for proper operation as a BS. Because preamble signals from a plurality of BSs should be distinguished from each other, a preamble index is used to distinguish the preamble signals. The preamble index consists of a segment IDentifier (ID) and an ID cell and is related to a preamble code, scrambling and sub-channelization. If adjacent BSs use the same preamble index, strong interference occurs between preamble signals of the BSs. Therefore, the preamble indexes should be allocated appropriately.

Generally, the preamble indexes are set by the system designer when the BSs are installed. However, in the case of a Self Configurable-BS (SC-BS) having an automatic installation function and an automatic network optimization function, a preamble index for the SC-BS is allocated adaptively while a system is working. The preamble index for the SC-BS is allocated adaptively because the SC-BS is installed based on a user's needs. Furthermore, it is expected that the SC-BS is installed in an indoor environment, thus an amount of interference affecting the SC-BS fluctuates widely. Accordingly, there is a need to provide a proper solution to allocate a preamble index to an SC-BS considering an indoor environment and a surrounding radio environment.

SUMMARY OF THE INVENTION

An aspect of the present invention is to address at least the above-mentioned problems and/or disadvantages and to provide at least the advantages described below. Accordingly, an aspect of the present invention is to provide an apparatus and method for allocating a preamble index minimizing interference to an SC-BS.

Another aspect of the present invention is to provide an apparatus and method for allocating a preamble index to an SC-BS based on a Received Signal Strength Indicator (RSSI) estimated by the SC-BS and a geographical distribution of BSs.

In accordance with an aspect of the present invention, an apparatus for managing a Self Configurable-Base Station (SC-BS) in a wireless communication system is provided. The apparatus includes a first selector for selecting a segment IDentifier (ID) to be allocated to an SC-BS by using per-segment ID Received Signal Strength Indicators (RSSIs) estimated by the SC-BS, a second selector for selecting an ID cell to be allocated to the SC-BS by using geographical location information of surrounding BSs, and a communicator for transmitting the segment ID and the ID cell to the SC-BS.

In accordance with another aspect of the present invention, an apparatus for an SC-BS in a wireless communication system is provided. The apparatus includes a controller for performing scheduling for a preamble signal scanning, an estimator for estimating RSSIs of preamble signals from BSs according to a scheduling result, and a communicator for transmitting an RSSI estimation result to a management server which manages SC-BSs.

In accordance with an aspect of the present invention, a method for allocating a preamble index of a management server in a wireless communication system is provided. The method includes selecting a segment ID to be allocated to an SC-BS by using per-segment ID RSSIs estimated by the SC-BS, selecting an ID cell to be allocated to the SC-BS by using the geographical location information of surrounding BSs, and transmitting the segment ID and the ID cell to the SC-BS.

In accordance with another aspect of the present invention, a method for operating an SC-BS in a wireless communication system is provided. The method includes performing scheduling for a preamble signal scanning, estimating Received Signal Strength Indicators (RSSIs) of preamble signals from BSs according to a scheduling result and transmitting an RSSI estimation result to a management server which manages SC-BSs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

Hereinafter, an exemplary technique for allocating a preamble index to a Self Configurable-Base Station (SC-BS) will be described. In the following description, the term "preamble index" denotes information for identifying a preamble which is transmitted by a BS to achieve frame synchronization, and consists of a segment IDentifier (ID) and an ID cell. Also, in the following description, exemplary embodiments of the present invention are described with reference to an Orthogonal Frequency Division Multiplexing (OFDM) wireless communication system. However, it is to be understood that this is as an example only, and that the present invention is applicable to other wireless communication systems.

Figure 1:
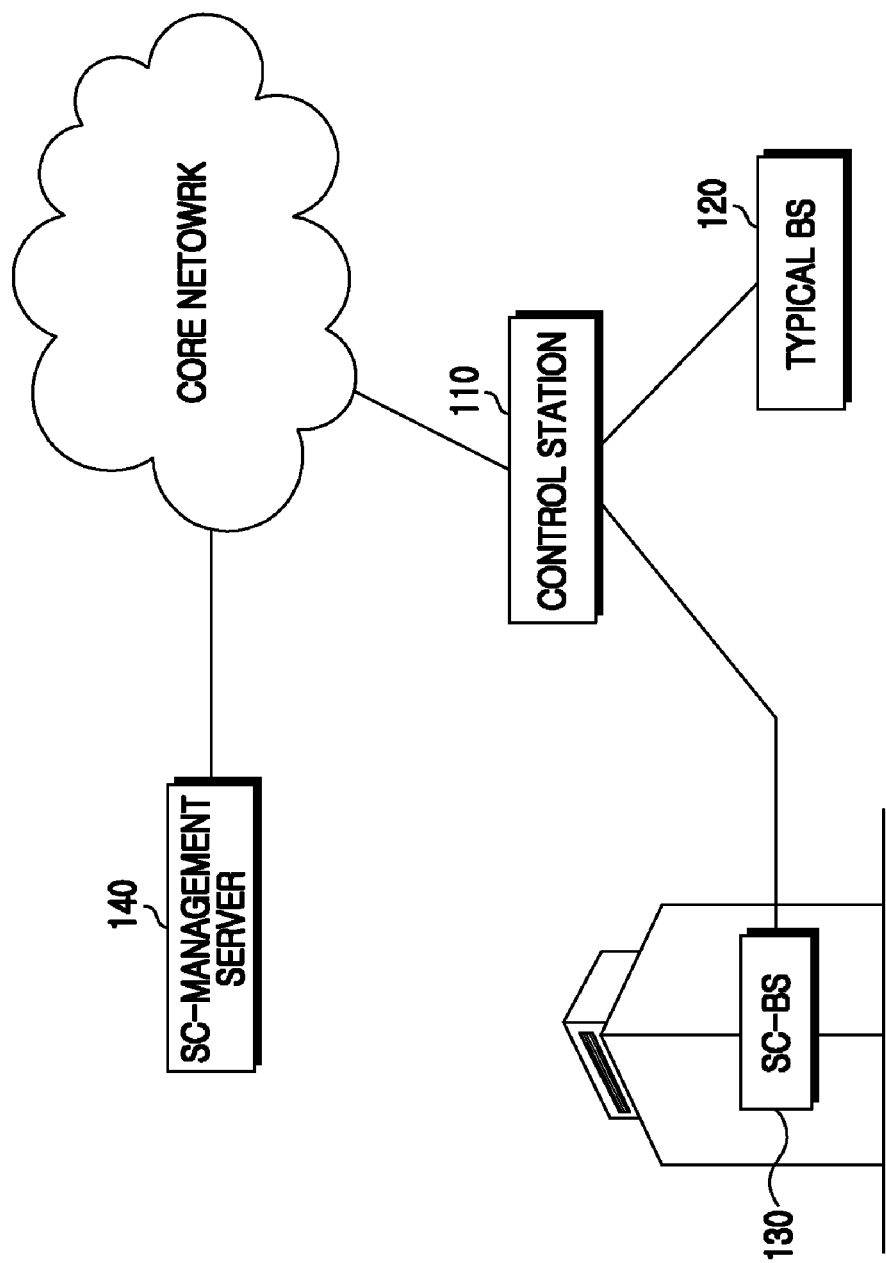
FIG. 1 illustrates a schematic configuration of a broadband wireless communication system according to an exemplary embodiment of the present invention.

FIG. 1 illustrates a schematic configuration of a wireless communication system including an SC-BS according to an exemplary embodiment of the present invention.

Referring to FIG. 1, the wireless communication system includes a control station 110 which operates as a gate way that allows BSs access to a core network, a typical BS 120 which is installed at an outdoor location without a self configuration function, an SC-BS 130 which is installed at an indoor location with the self configuration function, and an SC-management server 140 which manages SC-BSs.

The SC-BS 130 is typically installed by a user, as opposed to the operator of the subscriber network, and performs several functions such as the obtaining of an Internet Protocol (IP) address, authentication, registration, and downloading of images by communicating with the control station 110 and the SC-management server 140 at an initial installation. The SC-BS 130 also performs an optimization procedure for determining system parameters. The optimization procedure is performed upon initial installation without exception, and may additionally be performed periodically or when there is no system load during operation. A purpose of the optimization procedure is to observe the surrounding radio environment and the procedure includes a function for estimating received power from other BSs. In a certain system, the optimization procedure is referred to as 'Over The Air Receiver (OTAR) mode'.

The SC-management server 140 allocates a preamble index to the SC-BS 130. To assist with the preamble index allocation, the SC-BS 130 provides the SC-management server 140 with information on per-Frequency Allocation (FA) and per-segment ID Received Signal Strength Indicators (RSSIs) of preambles from other BSs. Accordingly, the SC-management server 140 determines a segment ID for the SC-BS 130 by using the per-FA RSSIs provided by the SC-BS 130, and determines an ID cell for the SC-BS 130 by using geographical location information on the SC-BS 130 and the other BSs. Herein, the segment ID is a parameter for distinguishing preamble code scramblings and subcarriers mapped with a preamble code. For instance, in case that 3 segment IDs are available, if a segment ID is '0', the preamble code is mapped at every $3n^{th}$ subcarrier (n is integer), and if a segment ID is '1', the preamble code is mapped at every $3n+1^{th}$ subcarrier (n is integer). The ID cell is a parameter for distinguishing preamble codes.

Hereinafter, an exemplary structure and operation of an SC-BS and an SC-management server for allocating a preamble index as stated above will be described in more detail with reference to the accompanying drawings.

Figure 3:
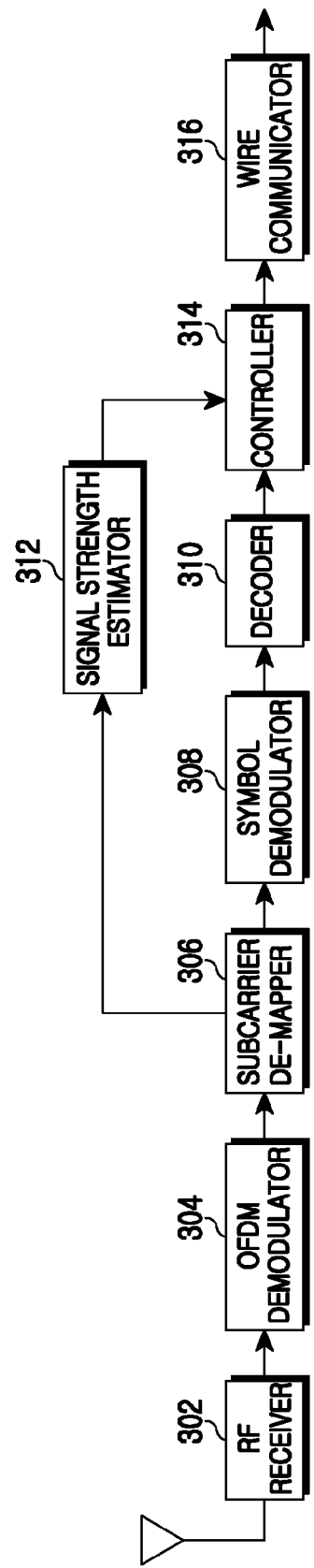
FIG. 3 is a block diagram of a Self Configurable-Base Station (SC-BS) in a broadband wireless communication system according to an exemplary embodiment of the present invention.

FIG. 3 is a block diagram of an SC-BS in a broadband wireless communication system according to an exemplary embodiment of the present invention.

Referring to FIG. 3, the SC-BS includes a Radio Frequency (RF) receiver 302, an OFDM demodulator 304, a subcarrier de-mapper 306, a symbol demodulator 308, a decoder 310, a signal strength estimator 312, a controller 314, and a wire communicator 316.

The RF receiver 302 receives an RF signal through an antenna and down-converts the RF signal into a baseband signal. The OFDM demodulator 304 divides signals provided by the RF receiver 302 by OFDM symbols, removes a Cyclic Prefix (CP), and restores complex symbols mapped onto a frequency domain by performing a Fast Fourier Transform (FFT) operation. The subcarrier de-mapper 306 extracts the complex symbols after classifying the complex symbols by processes. The symbol demodulator 308 demodulates the complex symbols and converts the symbols into a bit-stream. The decoder 310 performs channel decoding on the bit-stream and restores an information bit-stream.

The signal strength estimator 312 estimates the strength of signals received from other BSs. In an exemplary implementation, the signal strength estimator 312 estimates per-FA and per-segment ID RSSIs of preamble signals from the other BSs. In estimating the received signal strength of the preamble signals, the signal strength estimator 312 estimates the received signal strength of the preamble signals which correspond to preamble indexes in a preamble index set received with an optimization procedure start command from an SC-management server. That is, the signal strength estimator 312 detects frame synchronization by using the preamble indexes provided by the controller 314 in every frame within a signal strength period. After that, the signal strength estimator 312 estimates RSSIs, noise power and received power.

The controller 314 controls functions of the SC-BS. For instance, the controller 314 controls to perform the optimization procedure according to a command from the SC-management server. In an exemplary implementation, the controller 314 provides the signal strength estimator 312 with the preamble index set received from the SC-management server, and controls the signal strength estimator 312 to perform estimates per-FA and per-segment ID RSSIs. The controller 314 performs scheduling for a preamble signal scanning. That is, the controller 314 determines which preamble signals to scan at which frames. At that time, targets for scanning are preamble indexes included in the preamble index set received from the SC-management server. The controller 314 controls to transmit the per-FA and per-segment ID RSSIs estimated by the signal strength estimator 312 to the SC-management server. Moreover, the controller 314 controls so that the SC-BS operates according to system parameters from the SC-management server after the optimization procedure is completed.

The wire communicator 316 provides an interface for communicating with network entities which are connectable via a wired network. For instance, the wire communicator 316 reports the optimization procedure start command from the SC-management server to the controller 314. The wire communicator 316 transmits the per-FA and per-segment ID RSSIs provided by the controller 314 to the SC-management server.

Figure 4:
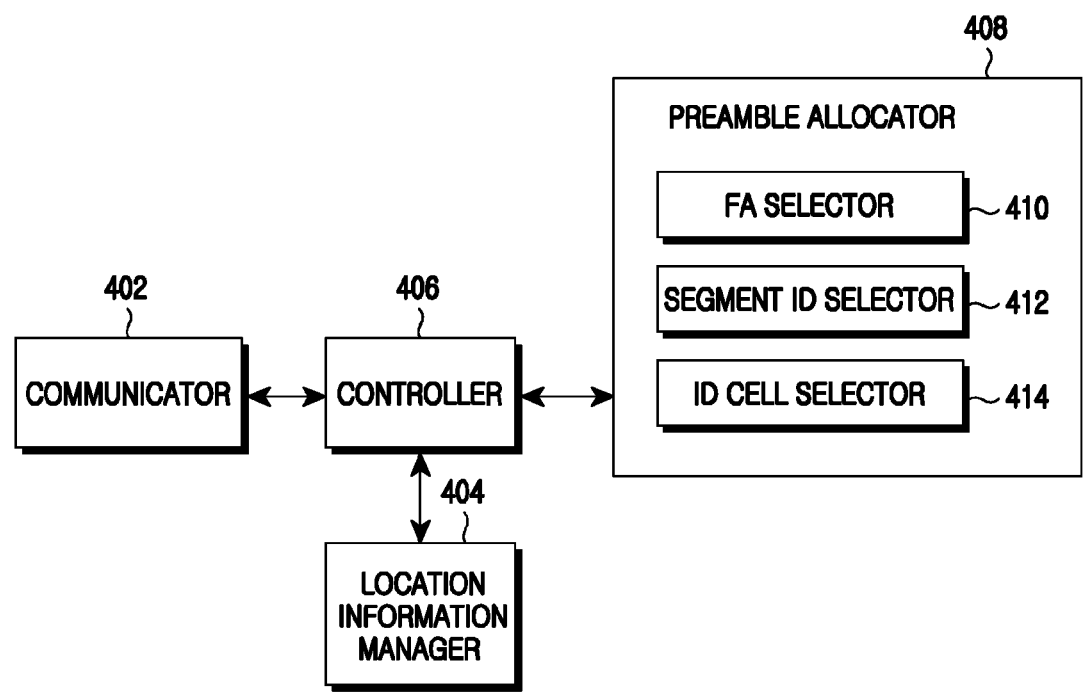
FIG. 4 is a block diagram of an SC-management server in a broadband wireless communication system according to an exemplary embodiment of the present invention.

FIG. 4 is a block diagram of an SC-management server in a broadband wireless communication system according to an exemplary embodiment of the present invention.

Referring to FIG. 4, the SC-management server includes a communicator 402, a location information manager 404, a controller 406, and a preamble allocator 408.

The communicator 402 provides an interface for communicating with network entities which are connectable via a wired network. For instance, the communicator 402 transmits the optimization procedure start command to an SC-BS, and receives the per-FA and per-segment ID preamble RSSIs from the SC-BS. Furthermore, the communicator 402 transmits a preamble index which is allocated to the SC-BS by using the per-FA and per-segment ID RSSIs.

The location information manager 404 manages geographical location information of BSs within a region under management of the SC-management server, and provides the geographical location information upon control of the controller 406. The controller 406 controls the overall functions of the SC-management server. For instance, the controller 406 controls to transmit the optimization procedure start command when an initially installed BS is recognized, when there is no system load, or on a periodic basis. The controller 406 performs a Dynamic Frequency Selection (DFS) procedure to change an FA of a BS which is operating, and a Transmit Power Control (TPC) procedure to change a transmit power of a BS which is operating according to a radio environment change. Moreover, for allocating the preamble index, the controller 406 may provide the preamble allocator 408 with the per-FA and per-segment ID RSSIs estimated by the SC-BS and the geographical location information of BSs managed by the location information manager 404. The controller 406 controls to transmit the preamble index allocated by the preamble allocator 408 to the SC-BS.

The preamble allocator 408 determines the preamble index to be used for the SC-BS by using the per-FA and per-segment RSSIs estimated by the SC-BS and the geographical location information of BSs managed by the location information manager 404. The preamble allocator 408 includes an FA selector 410, a segment ID selector 412, and an ID cell selector 414.

The FA selector 410 selects an FA to be allocated to the SC-BS by using the per-FA and per-segment ID RSSIs. However, if the DFS procedure is performed due to the radio environment change after an initial installation of the SC-BS, the FA selector 410 does not select the FA because the FA is determined through the DFS procedure. When there is a need to select the FA, the FA selector 410 determines RSSI sums for each of the FAs using Equation 1 below, and selects an FA corresponding to the minimum RSSI sum.

$$RSSI_{fk} = \sum_{s=1}^{3} RSSI_{fsk} \quad [\text{Eqn. 1}]$$

In Equation 1, the $RSSI_{fk}$ denotes a sum of RSSIs estimated by an SC-BS having index k in an FA having index f and the $RSSI_{fsk}$ denotes a sum of RSSIs for a preamble corresponding to a segment ID having index s estimated by an SC-BS having index k in an FA having index f.

The segment ID selector 412 selects a segment ID to be allocated to the SC-BS by using the per-segment ID RSSIs. The segment ID selector 412 selects a segment ID corresponding to the minimum RSSI among RSSIs estimated in the FA selected by the FA selector 410, as a segment ID for the SC-BS.

Figure 2:
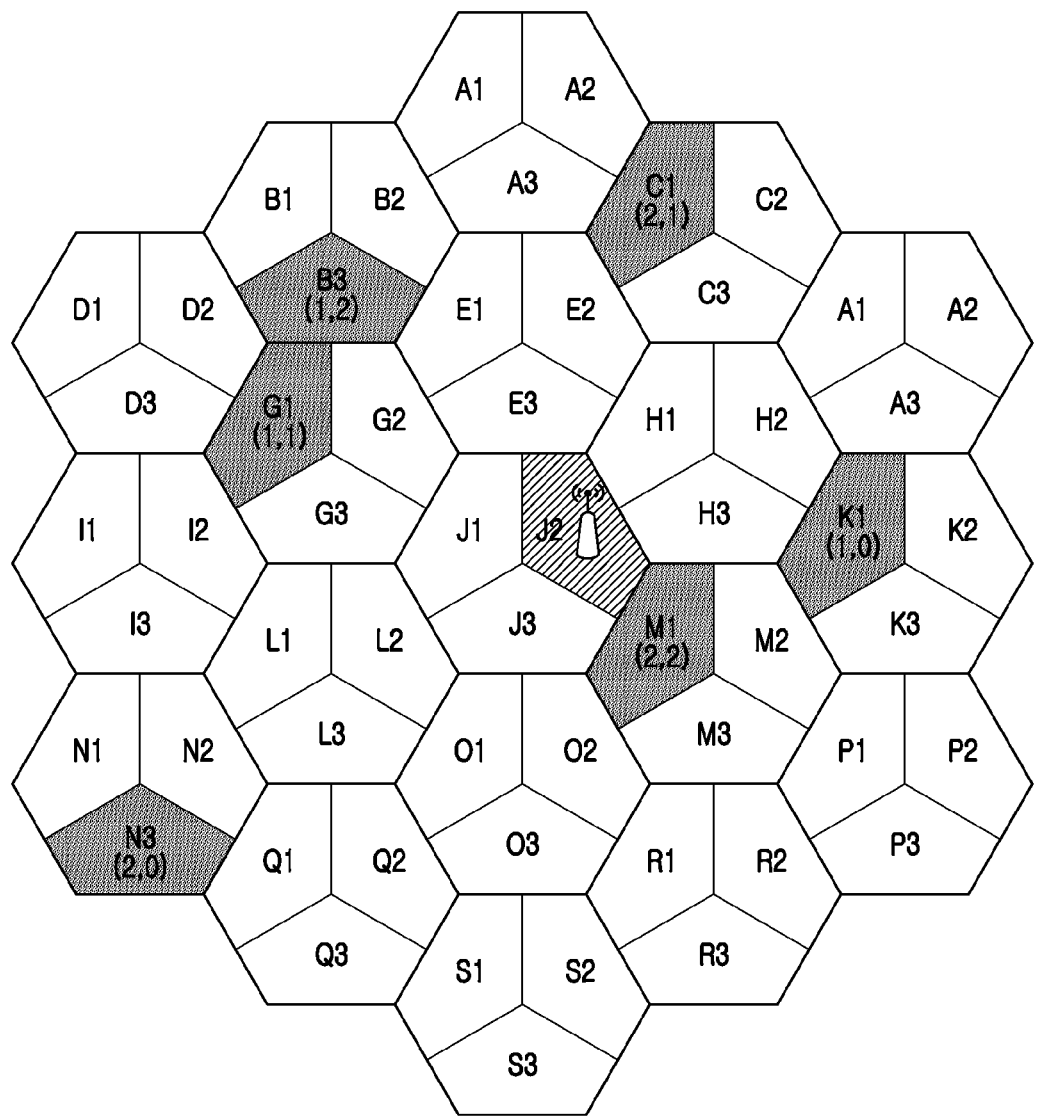
FIG. 2 illustrates a distribution of preamble indexes in a broadband wireless communication system according to an exemplary embodiment of the present invention.
Figure 2:
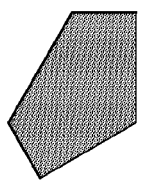

The ID cell selector 414 selects an ID cell to be allocated to the SC-BS by using the geographical location information of the BSs. First, the ID cell selector 414 determines an ID cell candidate set that includes ID cells which are allocated to BSs of which a received power level is equal to or less than a threshold, from among BSs using the selected FA and the selected segment ID. Then, the ID cell selector 414 searches the BSs having the minimum distance from the SC-BS in each of the ID cells that are included in the ID cell candidate set. The ID cell selector 414 selects an ID cell allocated to a BS of which a distance from the SC-BS is a maximum value among the BSs having the minimum distance, as the ID cell for the SC-BS. In other words, the ID cell selector 414 selects the ID cell of a BS that is farthest from the SC-BS from among the BSs having the minimum distance from the SC-BS in each of the ID cells included in the ID cell candidate set. It is assumed that preamble indexes are distributed as illustrated in FIG. 2, and the SC-BS is located in sector J2. In FIG. 2, '(a, b)' denotes that an ID cell is 'a' and a segment ID is 'b'. In the case of FIG. 2, if merely the farthest ID cell might be selected, ID cell '2' of sector N3 is selected. However, by selecting ID cell '1' used in sector K1 which is farthest among most adjacent sectors (sector M1 for ID cell '2' and sector K1 for ID cell '1') for each of 2 ID cells, the least affective ID cell to the SC-BS is selected.

The preamble allocator 408 provides the controller 406 with the FA selected by the FA selector 410, the segment ID selected by the segment ID selector 412, and the ID cell selected by the ID cell selector 414.

Figure 5:
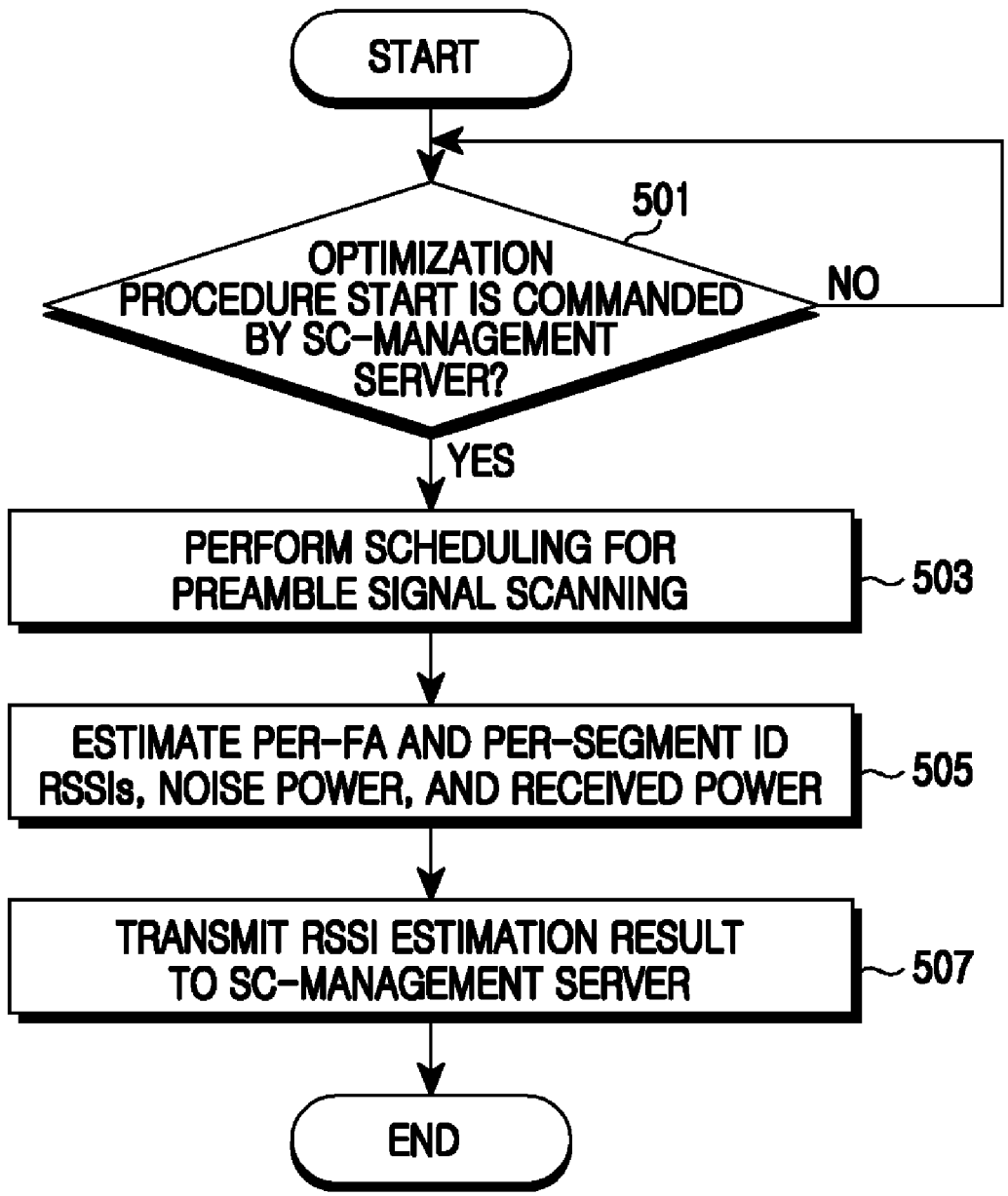
FIG. 5 is a flowchart illustrating a Received Signal Strength Indicator (RSSI) estimation process of an SC-BS in a broadband wireless communication system according to an exemplary embodiment of the present invention.

FIG. 5 is a flowchart illustrating an RSSI estimation process of an SC-BS in a broadband wireless communication system according to an exemplary embodiment of the present invention.

Referring to FIG. 5, in step 501, the SC-BS confirms that an optimization procedure start is commanded by an SC-management server. The optimization procedure start might be commanded when an initially installed BS is recognized, when there is no system load, or on a periodic basis.

If the optimization procedure start is commanded, the SC-BS proceeds to step 503. In step 503, the SC-BS performs scheduling for a preamble signal scanning. That is, the SC-BS determines which preamble signals to scan at which frames. At this time, targets for scanning are preamble indexes included in the preamble index set received from the SC-management server.

After scheduling for the scanning, in step 505, the SC-BS estimates per-FA and per-segment ID RSSIs, noise power, and received power according to the scheduling result. That is, the SC-BS detects frame synchronization by using the preamble indexes in every frame according to the scheduling result, then estimates RSSIs, noise power and received power.

Thereafter, in step 507, the SC-BS transmits an RSSI estimation result to the SC-management server. At this time, the SC-BS classifies the RSSI estimation result by FAs and segment IDs, then, transmits the RSSI estimation result.

Figure 6:
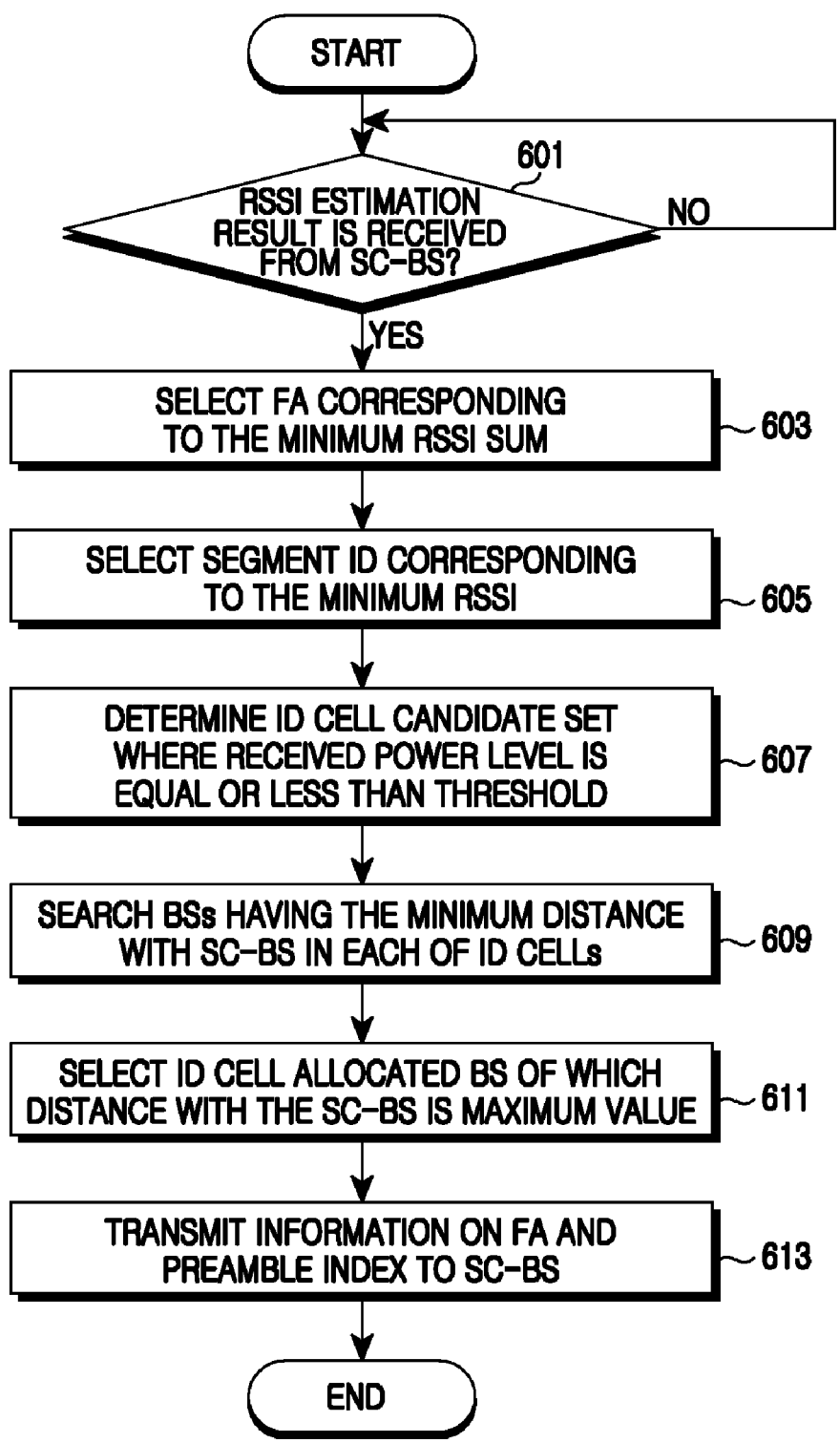
FIG. 6 is a flowchart illustrating a preamble index allocation process of an SC-management server in a broadband wireless communication system according to an exemplary embodiment of the present invention.

FIG. 6 is a flowchart illustrating a preamble index allocation process of an SC-management server in a broadband wireless communication system according to an exemplary embodiment of the present invention.

Referring to FIG. 6, in step 601, the SC-management server determines if an RSSI estimation result is received from an SC-BS. In an exemplary implementation, the RSSI estimation result is received in a state of being classified by FAs and segment IDs.

If the RSSI estimation result is received, the SC-management server proceeds to step 603. In step 603, the SC-management server selects an FA corresponding to the minimum RSSI sum as an FA for the SC-BS. Specifically, the SC-management server determines RSSI sums for each of the FAs using Equation 1 above, and selects an FA corresponding to the minimum RSSI sum.

After selecting the FA, in step 605, the SC-management server selects a segment ID corresponding to the minimum RSSI among RSSIs estimated in an FA selected in step 603 as a segment ID for the SC-BS.

After selecting the segment ID, in step 607, the SC-management server determines an ID cell candidate set including ID cells which are allocated to BSs of which received power level is equal to or less than a threshold. That is, the SC-management server excludes ID cells which are used by BSs of which received power level is greater than the threshold from candidates among BSs using the selected FA and the selected segment ID.

After determining the ID cell candidate set, in step 609, the SC-management server searches the BSs having the minimum distance from the SC-BS in each of ID cells which are included in the ID cell candidate set. In other words, the SC-management server confirms geographical location of the BSs using ID cells in the ID cell candidate set, then searches for the most adjacent BSs for each of ID cells.

After searching the BSs having the minimum distance, in step 611, the SC-management server selects an ID cell allocated to a BS having a distance from the SC-BS at a maximum value among the BSs having the minimum distance, as the ID cell for the SC-BS. In other words, the SC-management server selects the ID cell of the BS which is farthest from the SC-BS among the BSs having the minimum distance with the SC-BS in each of ID cells.

In step 613, the SC-management server transmits the FA, the segment ID and the ID cell, that is, information on the FA and a preamble index to the SC-BS.

In the aforementioned exemplary embodiment illustrated in FIG. 6, the SC-management server selects the FA by using RSSIs. That method is appropriate to the case in which an SC-BS is initially installed. However, if the DFS procedure is performed due to the radio environment change after an initial installation of the SC-BS, the step 603 for selecting the FA might be omitted because the FA is determined through the DFS procedure.

As stated above, due to allocating a preamble index by using an RSSI estimated by an SC-BS and geographical location information of BSs, the selected preamble minimizes interference among BSs.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for managing a Self Configurable-Base Station (SC-BS) in a wireless communication system, the apparatus comprising:
   a first selector for selecting a segment IDentifier (ID) to be allocated to an SC-BS by using per-segment ID Received Signal Strength Indicators (RSSIs) estimated by the SC-BS;
   a second selector for selecting an ID cell to be allocated to the SC-BS by using geographical location information of surrounding BSs and for excluding at least one ID cell corresponding to at least one BS having a received power level that is greater than a threshold; and
   a communicator for transmitting the segment ID and the ID cell to the SC-BS.

2. The apparatus of claim 1, wherein the first selector selects a segment ID corresponding to a minimum RSSI among RSSIs estimated in a Frequency Allocation (FA) allocated to the SC-BS.

3. The apparatus of claim 1, wherein the second selector searches BSs having a minimum distance from the SC-BS in each of the ID cells, and selects an ID cell allocated to a BS having a distance from the SC-BS that is a maximum value from among the BSs having the minimum distance.

4. The apparatus of claim 1, further comprising:
   a third selector for selecting an FA to be allocated to the SC-BS.

5. The apparatus of claim 4, wherein the third selector determines RSSI sums for each of FAs, and selects an FA corresponding to the minimum RSSI sum as the FA to be allocated to the SC-BS.

6. A method for allocating a preamble index of a management server which manages a Self Configurable-Base Station (SC-BS) in a wireless communication system, the method comprising:
   selecting a segment IDentifier (ID) to be allocated to an SC-BS by using per-segment ID Received Signal Strength Indicators (RSSIs) estimated by the SC-BS;
   selecting an ID cell to be allocated to the SC-BS by using geographical location information of surrounding BSs and excluding at least one ID cell corresponding to at least one BS having a received power level that is greater than a threshold; and
   transmitting the segment ID and the ID cell to the SC-BS.

7. The method of claim 6, wherein the selecting of the segment ID comprises selecting a segment ID corresponding to a minimum RSSI among RSSIs estimated in a Frequency Allocation (FA) allocated to the SC-BS.

8. The apparatus of claim 6, wherein the selecting of the ID cell comprises,
   searching BSs having a minimum distance from the SC-BS in each of ID cells; and
   selecting an ID cell allocated to a BS having a distance from the SC-BS that is a maximum value from among the BSs having the minimum distance.

9. The method of claim 6, further comprising selecting an FA to be allocated to the SC-BS.

10. The method of claim 9, wherein the selecting of the FA comprises,
    determining RSSI sums for each of FAs; and
    selecting an FA corresponding to the minimum RSSI sum as an FA for the SC-BS.

* * * * *